Feb. 20, 1968   A. F. RODRIGUES ET AL   3,369,271
MANUFACTURE OF PLASTIC ARTICLES
Filed April 12, 1966   10 Sheets-Sheet 8

INVENTORS.
ANTHONY F. RODRIGUES
CLINTON B. PIKE
BY
*Allen and Chromy*
ATTORNEYS

United States Patent Office 3,369,271
Patented Feb. 20, 1968

3,369,271
MANUFACTURE OF PLASTIC ARTICLES
Anthony F. Rodrigues, Los Gatos, and Clinton B. Pike, Santa Clara County, Calif., assignors to Becton, Dickinson of California, Inc., Los Gatos, Calif., a corporation of California
Filed Apr. 12, 1966, Ser. No. 542,071
17 Claims. (Cl. 18—2)

The present invention relates to an apparatus for removing molded plastic articles such as dip-molded articles, from the molds on which they were formed, and is concerned, more particularly, with improved methods and apparatus which operate in time with the molding apparatus to strip the articles from the mold so that the molds can be returned without damage for subsequent article forming operations.

It is a general object of the invention to provide improved methods and apparatus for removing articles from molds.

It is a further object of the invention to provide an apparatus for stripping a molded article in which means is provided for centering or positioning the mold and the article thereon with respect to the stripping means irrespective of the exact position of the conveyor means carrying the mold.

Another object of the invention is to provide a stripping apparatus in which the molds and the stripping heads are advantageously positioned with respect to each other during the stripping operation and in which the stripped article is seized before it is released by the mold or the head and conveyed away for discharge.

A similar object of the invention is to provide improved stripping apparatus including improved means for reversibly driving the cuff rolling elements on the stripping head.

Still another object of the invention is to provide stripping apparatus including improved means for preventing breakage of the apparatus in case of a jam.

Another object of the invention is to provide improved means for receiving the molded articles from the stripping head after removal thereof from the mold and conveying these articles away in a desired manner for subsequent handling or disposal.

A still further object of the invention is to provide improved means for controlling the position of the molds as they are about to enter the stripping heads for operation of the stripping heads on the articles thereon.

Other objects and advantages of the invention will be apparent from the following description of a preferred embodiment thereof taken in connection with the accompanying drawings, in which:

The apparatus of the present invention is an improvement on the stripping apparatus as disclosed in the application of Keesling et al., Serial No. 340,037, filed January 24, 1964, now Patent No. 3,304,576, to which reference is made for portions of the apparatus not fully disclosed herein.

Figure 1:
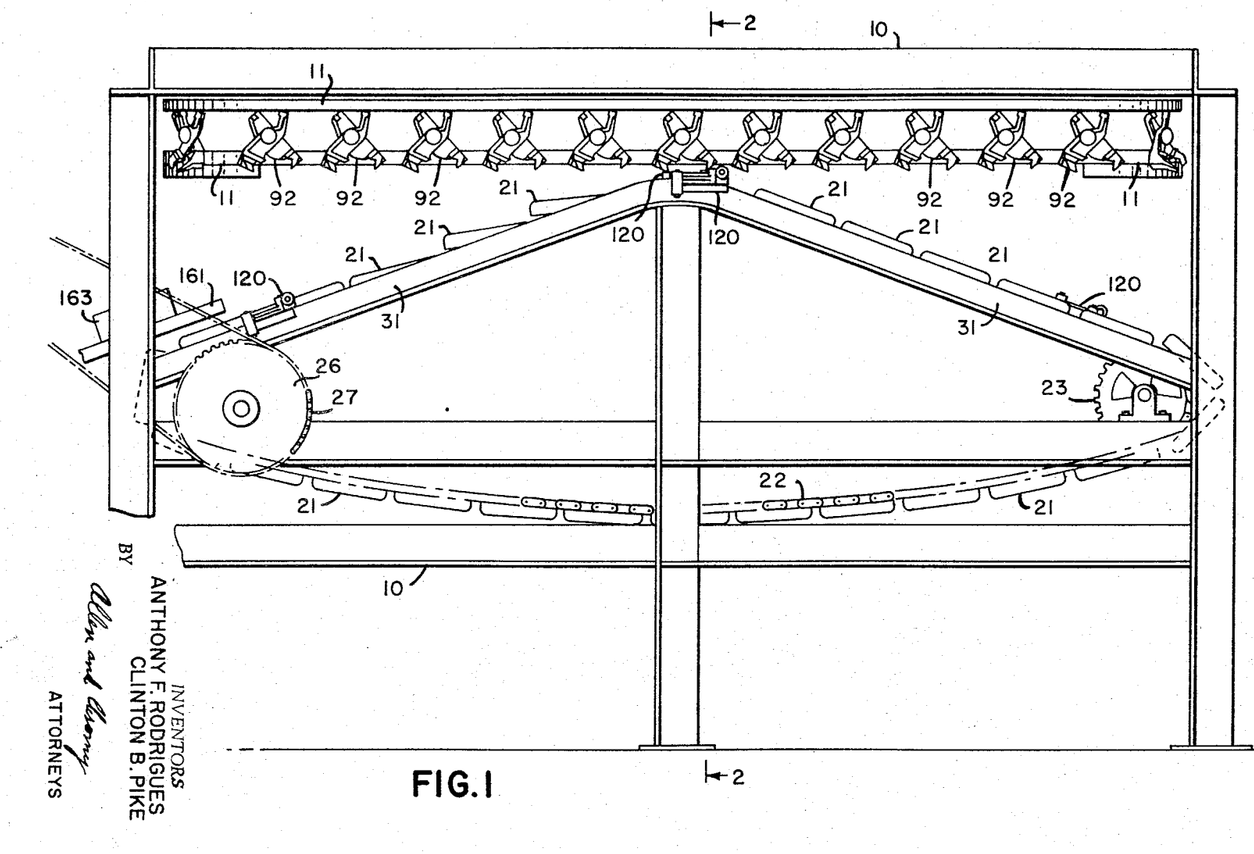
FIG. 1 is a side elevational view of the apparatus.
Figure 2:
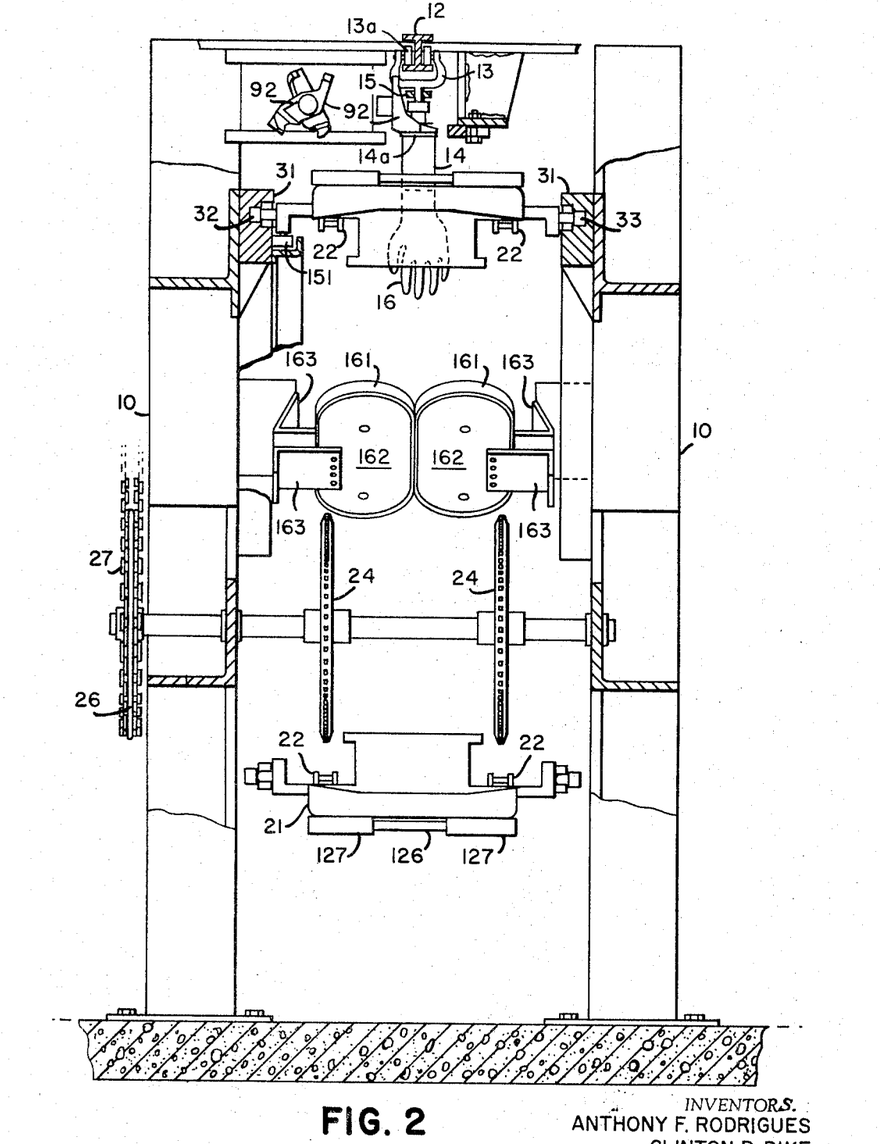
FIG. 2 is a sectional view of the apparatus taken in the plane indicated by the line 2—2 in FIG. 1.

Referring to FIGS. 1 and 2 there is illustrated apparatus embodying the present invention and capable of carrying out the method of the present invention. Such apparatus includes a frame 10 including upper transverse horizontal frame members 11 to which is secured a track 12. The track 12 supports a series of roller-supported mold carriers 13 having molds 14 depending therefrom. The carriers 13 are connected by a chain 15 and have rollers 13a resting on the I-shaped track 12. Each of the molds 14 has a loose connection to one of the links of the chain 15 and carries thereon a molded article, such as a glove 16.

The frame 10 also supports a stripper conveyor including an endless series of stripper members or heads 21, which are carried by respective endless chains 22 trained about idler sprockets 23 and driving sprockets 24 suitably journalled on the frame. The shaft of the driving sprocket 24 also carries a sprocket 26 which is connected to a chain 27 driven in synchronism with the mold carrier chain 15. There is one of the stripping units or heads 21 for each of the molds 14 along the coinciding portions of their paths of travel. The path of a head 21, as it leaves the idler sprocket 23, is inclined upwardly as guided by a pair of opposite cams 31 (FIGS. 1 and 2) having respective pairs of cam tracks 143, 144 (FIG. 3) in which respective pairs of rollers 141, 142 at the sides of each of the stripping units 21 travel. This cam 31 controls the motion of a stripping unit during its travel along the upper stretch of the chains 22 from the idler sprockets 23 to the driving sprockets 24.

Each stripping unit or head 21 comprises a cast frame structure 41 (FIGS. 7 and 8) having a central opening 43 therethrough. The conveying chains 22 are attached in a conventional manner to each stripping head.

Each stripping head is provided with four suitable bosses 51 (FIGS. 7 and 8) symmetrically disposed about the opening 43 and in which bearings are mounted for respective vertical shafts 52 rotatably carried therein. Each of the vertical shafts 52 has pivotally mounted thereon a hollow hub 56 of a stripping arm 57 carrying at its outer end a stripping assembly referred to hereinafter.

Figures 7, 9:
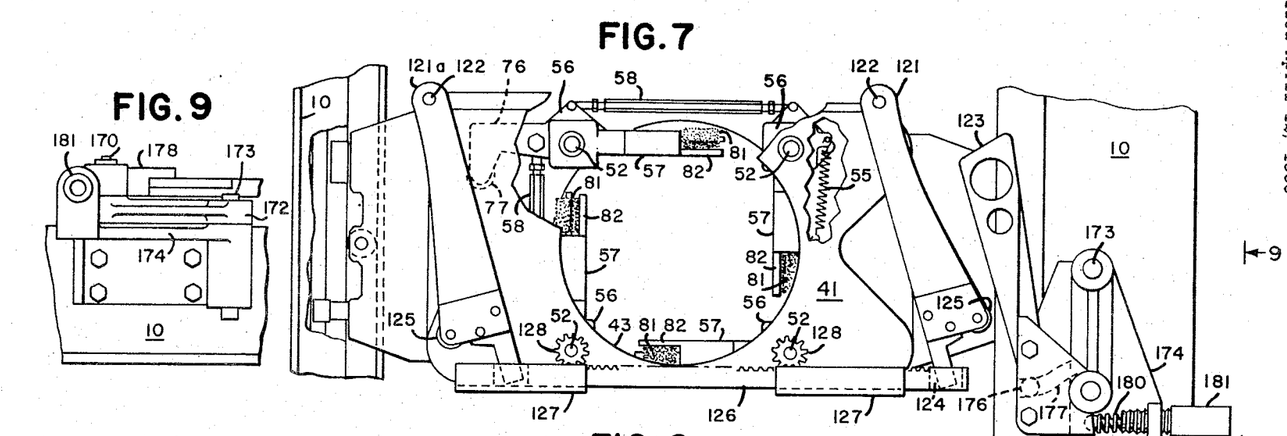
FIG. 7 is a plan view of one of the stripping heads with a portion of the head broken away.
FIG. 9 is an elevational view of one of the cam control mechanisms and its automatic release and is taken as indicated by the line 9—9 in FIG. 7.
Figure 8:
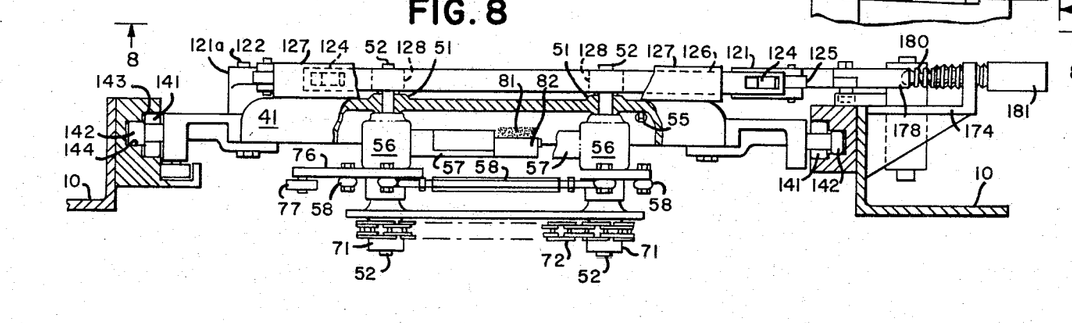
FIG. 8 is a side elevational view of the stripping head with certain parts broken away and shown in section to illustrate details of construction as indicated by the line 8—8 in FIG. 7.

Means is provided for providing the stripping arms with a common actuating connection to control their closing and opening movement with respect to a mold positioned in engagement therewith for stripping. Preferably, this common actuating connection is in the form of rods 58 (FIG. 7) and this connection has lost motion in its control connection to each of the arms so that it is in control when the arms are moved to open position with respect to a mold, but, in the closed condition, the arms 57 are free to move sufficiently with respect to the operating connection to adjust themselves to an out-of-round condition of the mold itself, as disclosed in said application. The stripper arm assemblies are connected to pivot together about their respective pivot shafts 52. Also, each of the arms 57 has secured to its hub 56 a spring 55 urging the arm in a clockwise direction, as viewed in FIG. 7, so that all the arms are urged inwardly with respect to the opening 43 and a mold positioned therein. As seen in FIGS. 7 and 8, one of the stripping units is formed with an extending arm 76 having a depending roller 77 for actuation by cam means (not shown) as the stripping unit travels along in a manner later described.

Means is also provided for rotating the shafts 52 in either direction to control the operation of the stripping means. Adjacent its lower end each shaft 52 also carries a sprocket 71 (FIG. 8) and these sprockets are connected by a chain 72 to provide a common drive connection for the shafts 52 of the various stripper arms.

Each of the stripping arms 57 has means at its free end for engagement with a mold and with the article thereon to perform gripping and control operations in connection with the stripping operation, including the forming of an enlarged roll or cuff at the open end of the article, and the unrolling of this roll into engagement with two cooperating elements which thereafter act as a pair of gripping means to grip and hold the open end of the article during its movement away from and stripping from the mold. Each of the stripping arms 57 (FIGS. 7, 16 and 18) has secured at the reduced end of its shaft a rotary brush 81 which acts as an article moving means and a part of the gripping means. The brush 81 has associated therewith a cooperating article gripping element in the form of a spade 82 which is tapered at its lower end (FIG. 19) to provide an entry portion for the gripping element to enter between the mold and the plastic article formed thereon, as described in said application.

Figure 16:
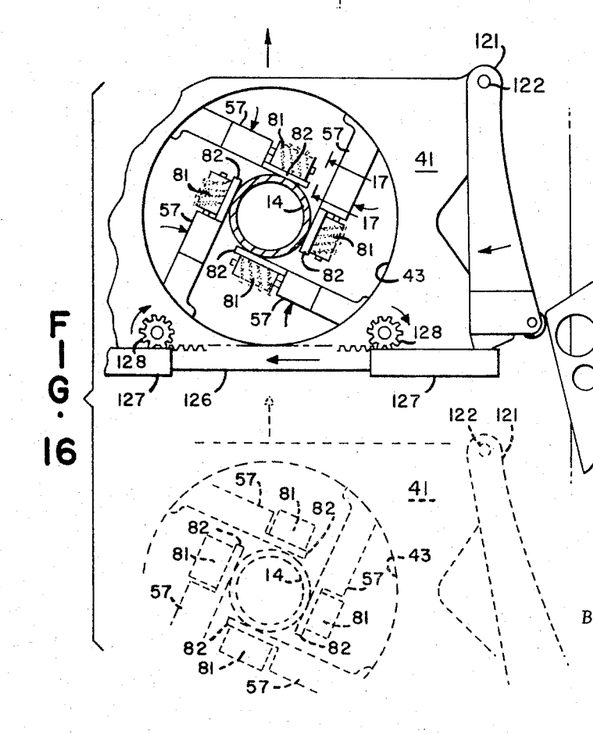
FIG. 16 shows in full lines one of the stripping heads and the drive for the rotatable elements thereof during rolling of a cuff prior to gripping. The dotted line shown indicates the relation of the head following to that shown in full lines.
Figures 18, 19:
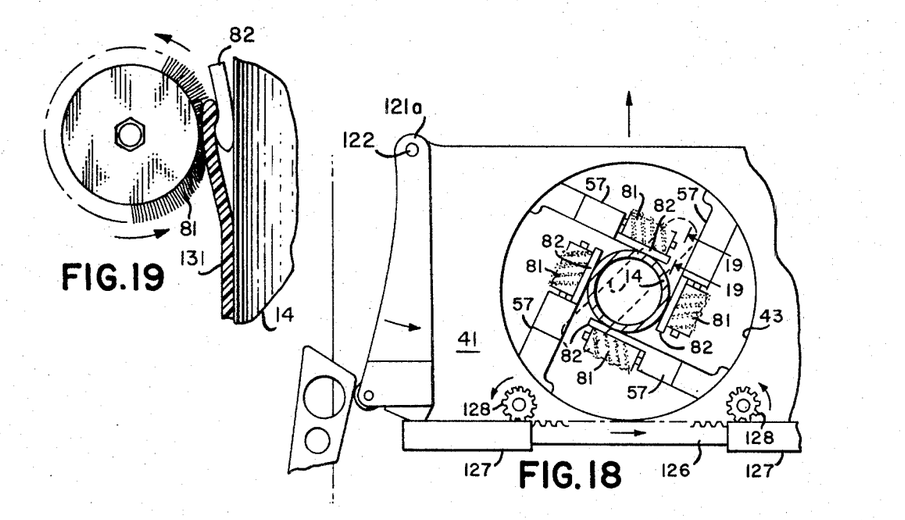
FIG. 18 is a schematic plan view illustrating the drive of the operating rack for the cuff rollers of the stripping apparatus driving the glove gripping operation.
FIG. 19 is a fragmentary sectional view illustrating the gripping of a molded article by the stripping head taken as indicated by the line 19—19 in FIG. 18.

Means are provided on the frame to open the four stripper arms to an inactive position to receive a mold with a glove thereon as they are beginning the ascending portion of the upper stretch of their travel, and this means takes the form of a suitable cam which engages the roller 77 (FIGS. 7 and 8), and through the arm 76 moves the gripping arms 57 outwardly. As seen in FIG. 7, where the stripping heads and their gripping means at the end of the arms 57 are in their extreme open position permitting the passage of a glove mold down therethrough as the stripping head is being elevated. As the stripping head is passing the position where the roller 77 moves off of its control cam (not shown) the gripping means comprising the spades 82 and the brushes 81 are moved into active position by the spring 55 (FIG. 7) to engage a mold, as seen in FIGS. 16 and 18. This operation is disclosed in said application.

Positioning means are provided to put the molds in the proper position with respect to the stripping heads by changing their position with respect to the chains with which they are carried, having enough play in it to accommodate this positioning. This positioning means includes an endless conveyor carrying an endless series of mold positioning heads 92 (FIGS. 1, 3, 4, and 5) which are formed and mounted in scissor fashion and have a pair of scissor gripping arms or jaws 93 and 94 pivoted about the axis and mounting stud 96 carried by a frame 95 on the conveyor. The respective arms 93 and 94 (FIGS. 3, 4 and 13) have at their lower ends laterally projecting V-shaped jaws 91 which are adapted to engage and grip a portion 14a of a mold which is of generally circular contour. The upper arms of the scissor jaws or arms 93 and 94 have jaw portions 90 (FIGS. 3 and 4) to engage at either side of one of the trolley arms 13b of a mold carrier to assist in mold position control. The arm 93 (FIGS. 4, 5 and 14) is carried by a shaft 96 which is pivoted in a sleeve bearing in a sleeve 97 which carries the jaw 94. The sleeve 97 is pivotally mounted in a bearing sleeve carried by a boss 98 of the frame 95 for the positioner head. This frame is shown in greater detail in FIG. 15 and it includes a base flange or pad 95a which is secured to the axes of certain of the pivotal connections of the link of the lower chain 101, and a similar upper pad portion 95b which is similarly connected to the upper chain, these upper and lower portions 95a and 95b being connected by a central upright frame portion 95c. Also, up-right rods 95d are provided between the upper and lower pad portions, and at its lower end the rod 95d is provided with a block 95e which slides in a slot in the lower pad 95a. The sleeve 97 extends through the boss 98 and carries an arm 99 having a cam follower 107 engaged in a cam track 108. The shaft 96 extends through the sleeve 97 and carries an arm 109 having a similar cam follower 111 also engaged in a cam track 108. The cam followers 107 and 111 are aligned vertically.

Figures 3, 3A, 3B, 4, 5, 6:
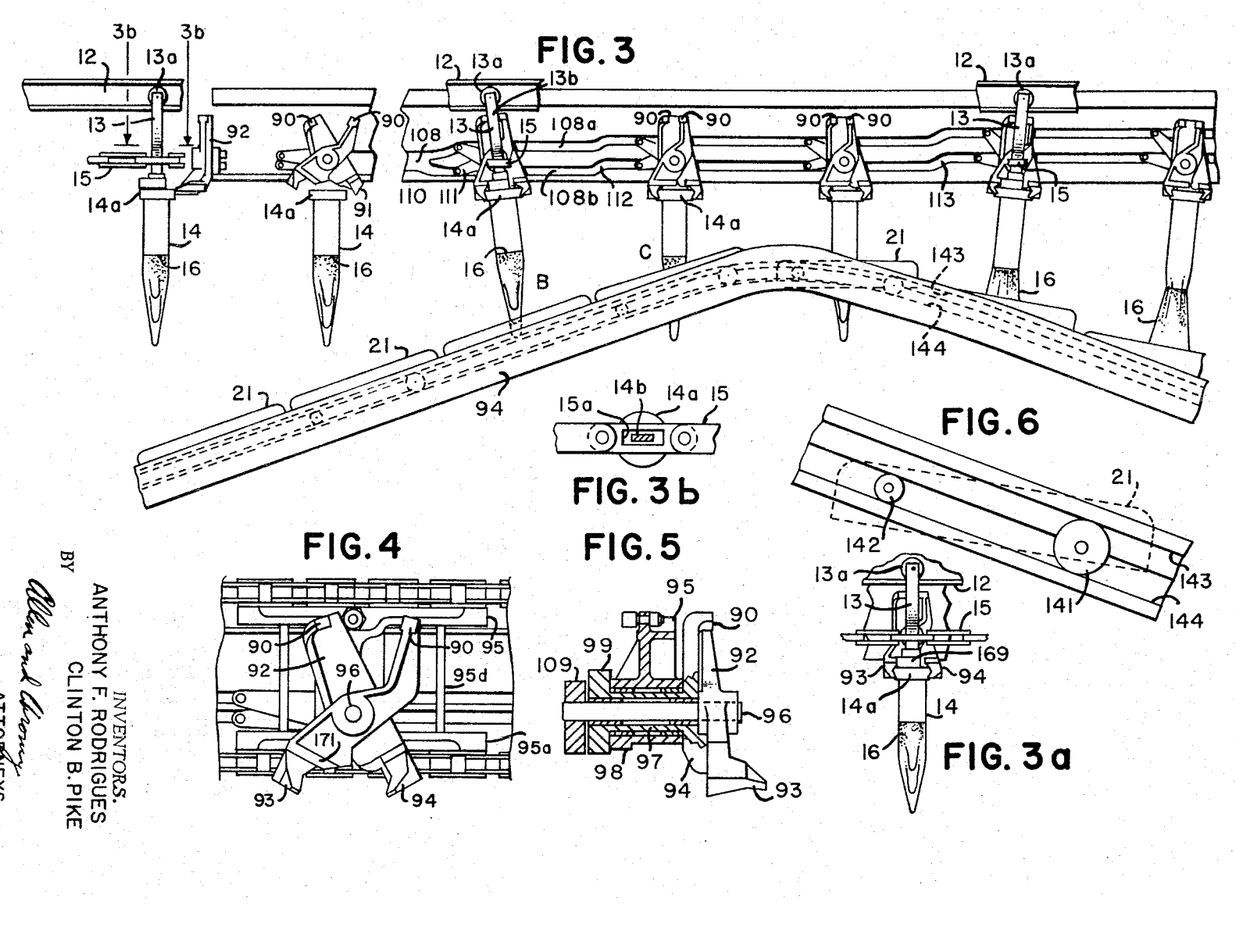
FIG. 3 is a schematic view illustrating the control of the position of the molds and the stripping heads as they approach the stripping zone and during stripping in their position with reference to the stripping heads.
FIG. 3a is a view of a mold and the associated positioning head at the time of engagement therebetween.
FIG. 3b is a detail sectional view taken in the plane indicated by line 3b—3b in FIG. 3.
FIG. 4 is an enlarged view of one of the positioning heads for the mold.
FIG. 5 is a side view, partially in section, of the apparatus shown in FIG. 4.
FIG. 6 is a schematic view of the cam tracks and rollers in their relation to the operation of a stripper head.
Figures 13, 14, 15:
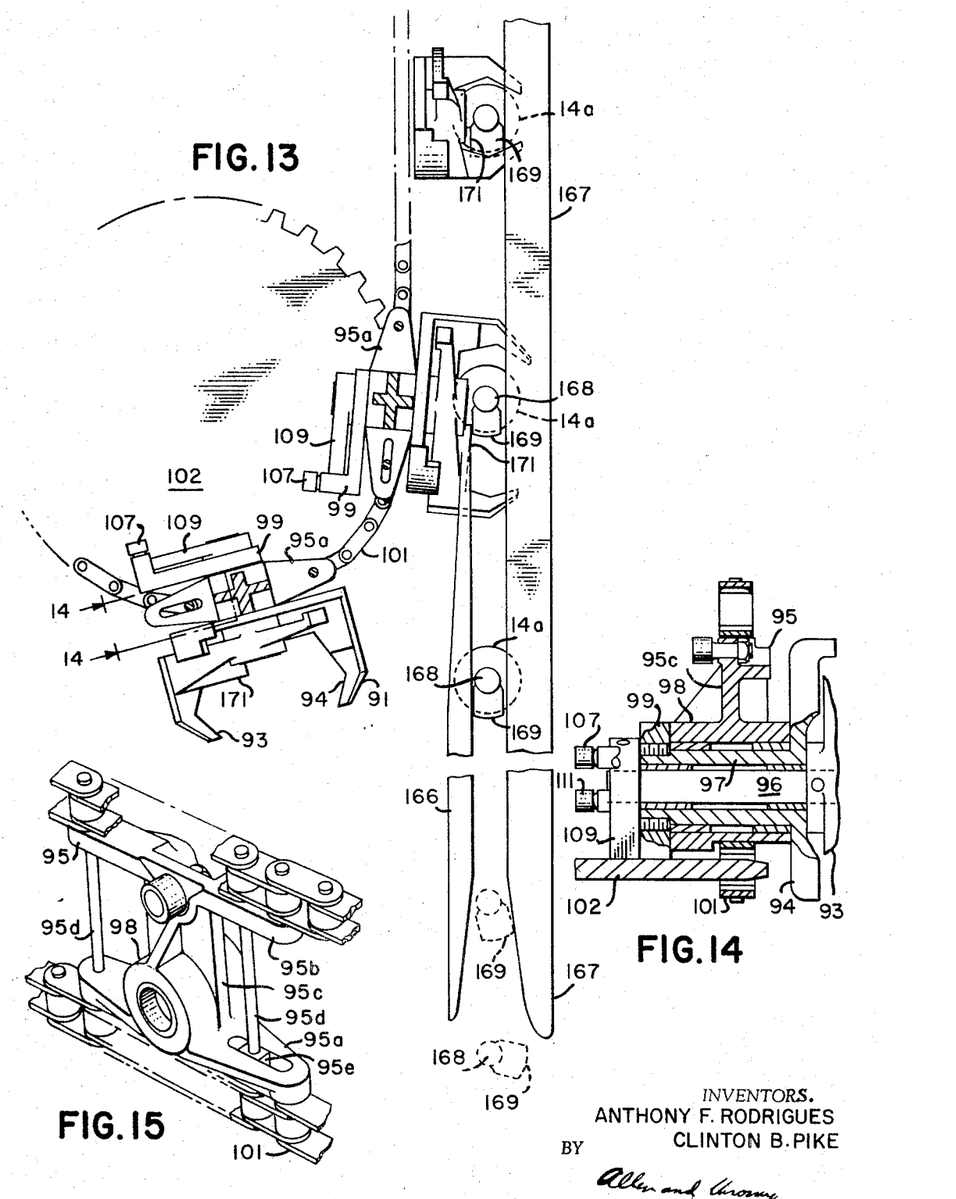
FIG. 13 is a schematic plan view of the portion of the machine taken where the molds are entering the positioning heads of the apparatus.
FIG. 14 is a sectional elevational view of part of a positioning head taken as indicated by the line 14—14 in FIG. 13.
FIG. 15 is a perspective view of the frame or casting for mounting the position heads on the conveying means therefor.

The positioner jaws or scissor members are open as they come around the sprocket 102 (FIGS. 1 and 13), being held in this position as they move around the turn by the arms 99 and 109 resting on the sprocket wheel 102, as seen in FIG. 14. Prior to this time, along the idle stretch of the path of travel of the positioning jaws, as seen in FIG. 1, the control arms are held in fixed position with their cam follower pins in a single cam track 108. In order to grip a mold at its upper circular part so as to obtain control thereof, as seen in FIG. 3, the cam tracks 108a and 108b diverge at 110 (FIG. 3) to effect gripping. As seen in FIG. 3b the link 15 of the chain which is in driving relation with the support rod 14b for a mold is slotted at 15a to allow a certain floating movement of the mold with respect to the chain. This allows centering of each mold by the positioning jaws 93 and 94 with respect to an associated stripper head within the limits of movement of the rod 14b within its associated slot 15a. Thus, the mold is centered irrespective of slack in the conveyor chain which might cause it to trail with respect to the stripping head so that it will enter accurately therein. Immediately thereafter at 110 the relative spacing of the tracks 108a and 108b causes tilting of the mold to aid its entry into the stripping head, as seen at B. After the entry is effected the cam track shape changes at 112 to effect a vertical positioning of the mold as seen at C.

Subsequently, as the molds travel along at the right of FIG. 3, there is again a raised portion 113 of the cam tracks which cause tilting of the mold in the opposite direction during its withdrawal from the descending form which is on the end of the divergent portion of the relation between the endless series of stripper heads and the endless series of mold carriers.

Each stripper head is provided with a cam controlled linkage for reversibly driving the brushes of the stripper head, as described above, and this linkage is controlled by "stationary" cam assemblies 120 positioned along each side of the path of movement of the stripper heads. There are four of these cam assemblies 120, as seen in FIG. 1. One cam assembly 120 is at the right of FIG. 1 to insure proper conditioning of the stripper heads in their open position. There are two cam assemblies 120 at the topmost position of a stripper head and one cam assembly 120 at the left of FIG. 1 in order to drive the brushes to insure release of the molded article, such as a glove, after stripping. The linkage for controlling the reversible drive of the stripper brushes comprises a pair of cam operating arms 121 and 121a (FIGS. 7, 16 and 18) each pivotally mounted at 122 on the stripper head casting and adapted to be engaged by respective cams 123 and 123a alongside the path of movement as later described.

The cam follower 121 (FIG. 7) is pivoted at 122 and has its roller 125 positioned for engagement with a cam 123 which is connected universally at 124 to a rack 126 carried by the frame for longitudinal sliding movement in the guides 127. The rack 126 engages two pinions 128 on two of the operating shafts 52 for the arms 57 and rotates them in a clockwise direction to cause rotation of each of the holding brushes 81, as seen in FIG. 16, in a counter-clockwise direction. The four shafts 52 are connected for simultaneous rotation by the sprockets 71 at the lower ends, as seen in FIG. 8, which are interconnected by the chain 72. This operation occurs while the stripping head is horizontal, as seen in FIG. 3, and relative movement between the stripping head and the mold to effect positioning of the spade adjacent the cup is effected during the first lowering movement of the stripping head. Thus, the mold is in vertical position with respect to a horizontal stripping head at the time that this operation is taking place, and at the time that the subsequent operation of actually gripping the article or glove by means of the gripping elements such as the brushes 81 and the spades 82, as will now be described.

Figure 10:
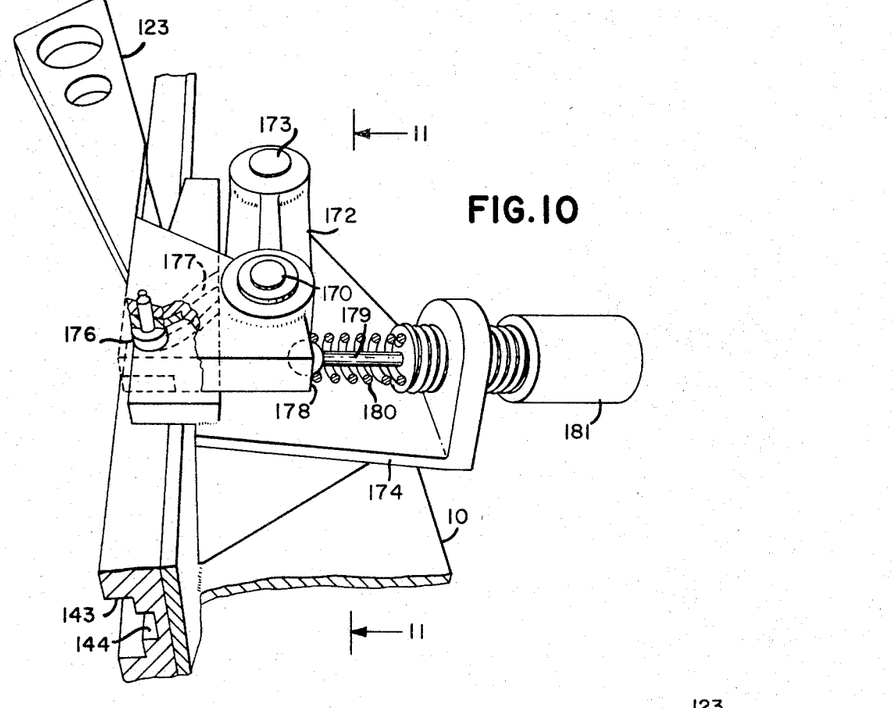
FIG. 10 is a perspective view of one of the cam mechanisms for operating the reversible drive, and illustrating the breakaway construction of the cam member in the event a jam occurs.
Figure 17:
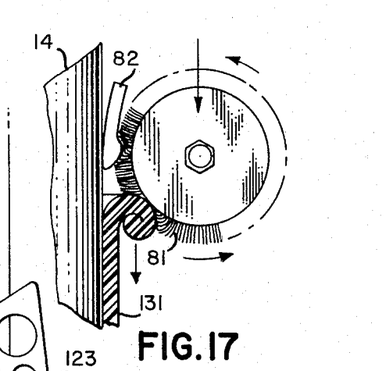
FIG. 17 is a sectional view taken in the plane indicated by the line 17—17 in FIG. 16.

As shown in FIG. 17, the cuff is rolled down to permit relative movement between the mold and the stripping head to position the spade 82 adjacent the cuff. Subsequently, as shown in FIGS. 10 and 19, the brushes are rotated in the opposite direction by means including an actuated cam follower 121a and a cam arm 123a so that the edge of the molded article 131 is carried up over the spade 82 and is gripped and held between the brush and the spade.

Immediately following this operation, the roller 77 on its arm 76 will engage a suitable cam which serves to again move the arms 57 and the gripping elements outwardly with respect to the mold. The glove being gripped at this time, the upper end will be stretched out free of the mold. As the roller 142 starts down the inclined portion of the track 144, the stripping head continues to lower with respect to the mold, so that the glove will start to be turned inside out as illustrated in FIG. 3, where further progress of the stripping operation has been performed. The rises indicated at 113 in FIG. 3 in the two parallel tracks governing the positioning or the molds, as controlled by the positioning heads, serves to incline the mold as viewed to the right of FIG. 3 as the stripping head is also inclined so as to present a favorable withdrawal position between these two parts of the apparatus while stripping the glove from the mold.

As seen in FIGS. 3, 6 and 7, the frame 41 of each stripping head carries a pair of rollers 141 and 142 at each side which engage in respective parallel cam tracks 143 and 144, to control the position of the head with respect to the conveyor on which it is carried.

Normally, the tracks 143 (FIG. 3) and 144 are parallel and extend along the normal path of the conveyor, however, these paths shift as seen by the position of the stripping heads in FIG. 1 as the heads pass over the apex as they travel down through the three positions there beyond, the track 143 being elevated so as to lift the front edge of the head to a substantially parallel relation as the beginning of the withdrawal of the mold occurs.

In order to control the position of the stripper head during the exertion of thrust thereon by the cams and the cam follower arms, the stripper head carries a depending roller 151 (FIG. 2) guided in a track 152 which extends parallel to the desired direction of travel of the head.

Figures 20, 21, 22:
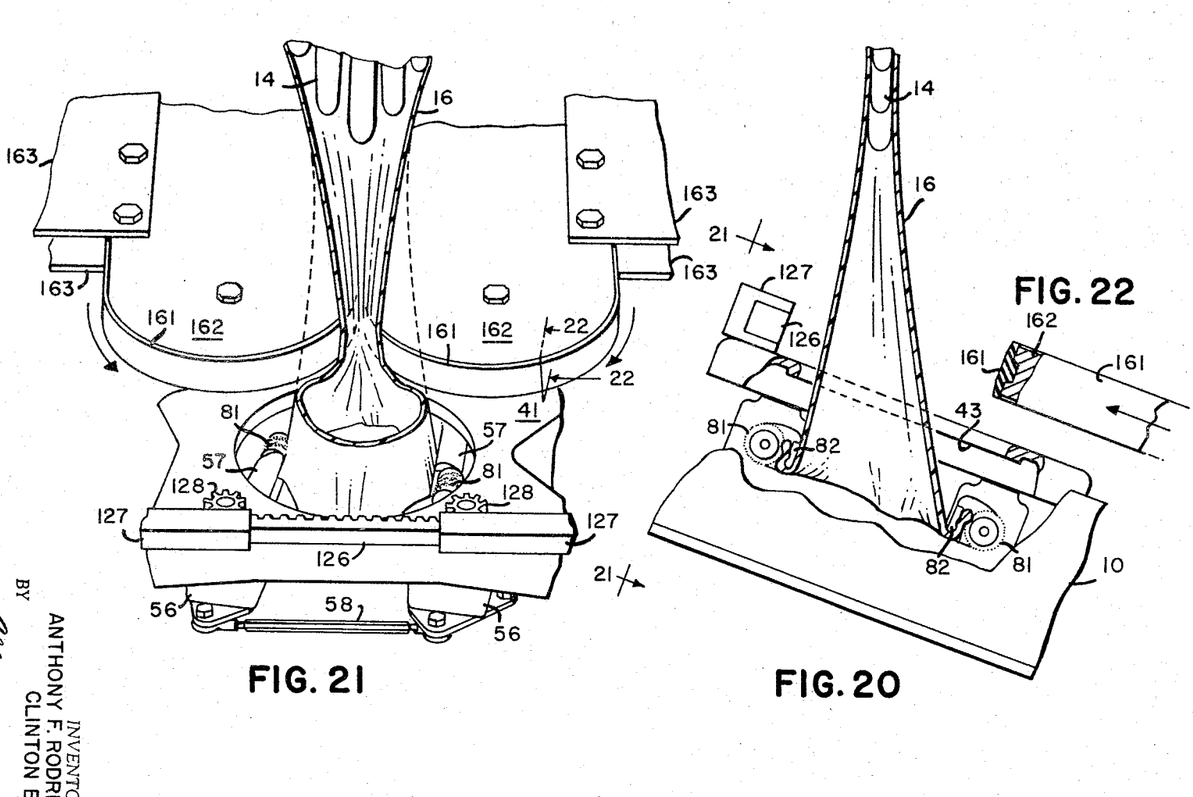
FIG. 20 is a schematic perspective view showing the molded article while it is still partially on the mold and still gripped by the stripping head and ready to be carried into engagement with the conveyors for gripping it and carrying it away.
FIG. 21 is a view similar to FIG. 20 being taken as indicated by the line 21—21 in FIG. 20.
FIG. 22 is a detail sectional view through the discharge conveyor element and taken as indicated by the line 22—22 in FIG. 21.

Referring to FIGS. 20 and 21, this shows the stripping head holding the open end of the glove, and the glove still retained on the fingers of the mold during the divergence of the endless series of stripping heads and the endless series of molds. Means is provided for gripping this stretched article, such as a glove, and conveying it away automatically. For this purpose a pair of opposed, engaged belt conveyors 161 (FIGS. 2, 21 and 22) are carried by suitable pulleys housed within a plate structure 162 which are carried by brackets 163 (FIG. 2) on the frame of the machine. These belts 161 grip and carry the molded article away as it is released from both the stripping head and from the mold, as seen in FIGS. 20 and 21.

Figure 11:
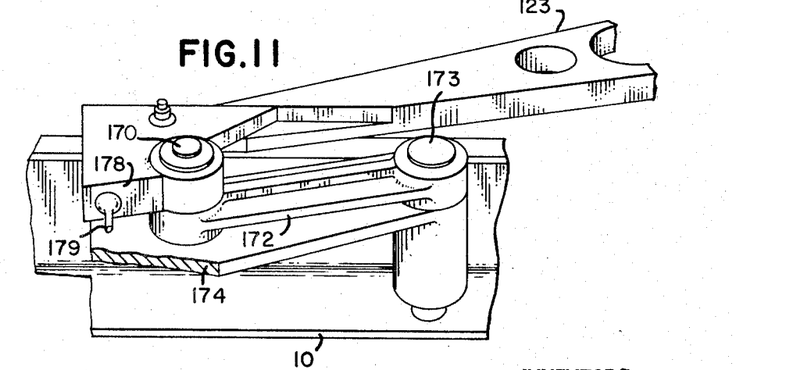
FIG. 11 is a schematic perspective view taken as indicated by the line 11—11 in FIG. 10.
Figure 12A:
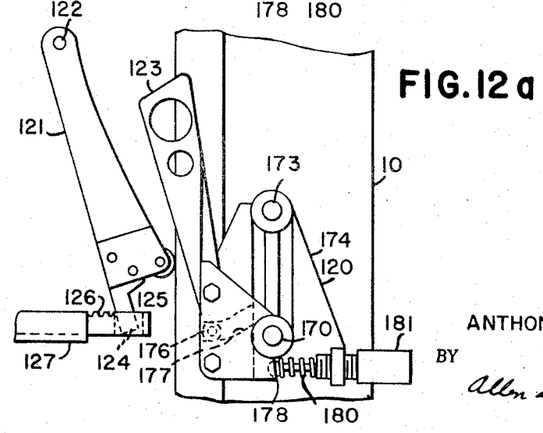
FIGS. 12a, 12b and 12c are schematic plan views illustrating the knee action mounting of the control cam for the cuff rolling drive parts of a head in various positions during the breakaway operation.
Figures 12B, 12C:
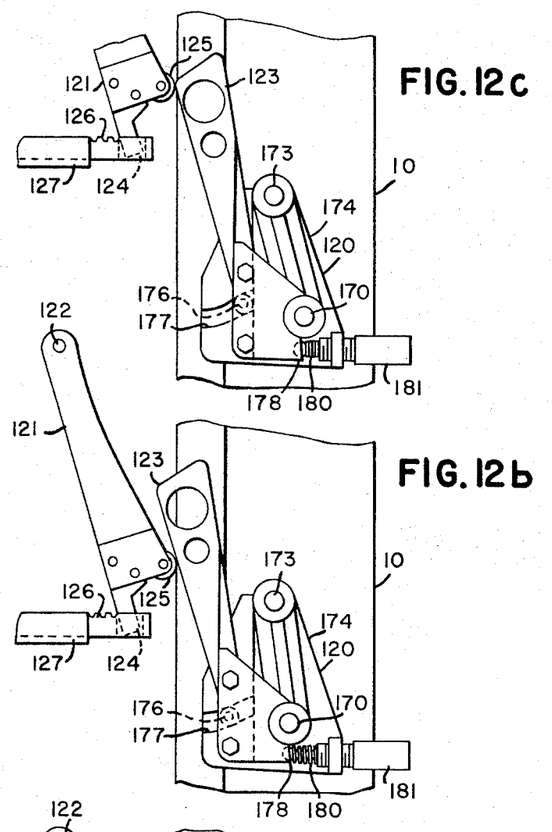

Means is provided to release the actuating arms 121, 121a in the event of a glove becoming entangled or wrapped around one of the brushes so as to jam it against turning. For this purpose, each of these cams 123 (FIGS. 10, 11 and 12) is pivotally mounted at 170 on a knee-action arm 172 pivotally at 173 on a bracket 174. Intermediate the length of the cam 123 a roller 176 is provided which engages a cam track 177. A stop plate 178 secured to the cam 123 is abutted by a spring pressed plunger 179 carried by an adjustable screw and nut mechanism 181. The spring 180 normally holds the roller 176 in a straight portion of the cam track 177, as seen in FIGS. 7 and 10. Upon a force greater than usual operating force pressure exerted against the cam 123, the spring 180 is compressed and allows the roller 176 to move into the inclined portion of the cam track 177 and the cam arm 123 moves out of the path of the cam follower roller and is seen in the FIG. 12a, FIG. 12b and FIG. 12c sequence.

Means is provided for controlling the positions of the molds as they enter the stripping mechanism, and referring to FIG. 13, this means includes a pair of side guide plates 166 and 167 and the support shafts 168 for the molds are aligned with the opening therebetween. Each support shaft 168 carries a tail or positioning member 169 which may be placed in either leading or trailing position, as seen in the lowest one in FIG. 13. As a guide 169 enters the V-shaped entrance end of the slot between the plates 166 and 167, it will be positioned centrally between the members in trailing relation, and the mold configuration will be placed in the desired position, as seen in FIG. 18. After the guide member 166 terminates, the tail members 169 are held between a face 171 of the jaws 93 and the guide member 167 to maintain the position of the tail member 169 and, therefore, of the mold 14 itself.

Figure 23:
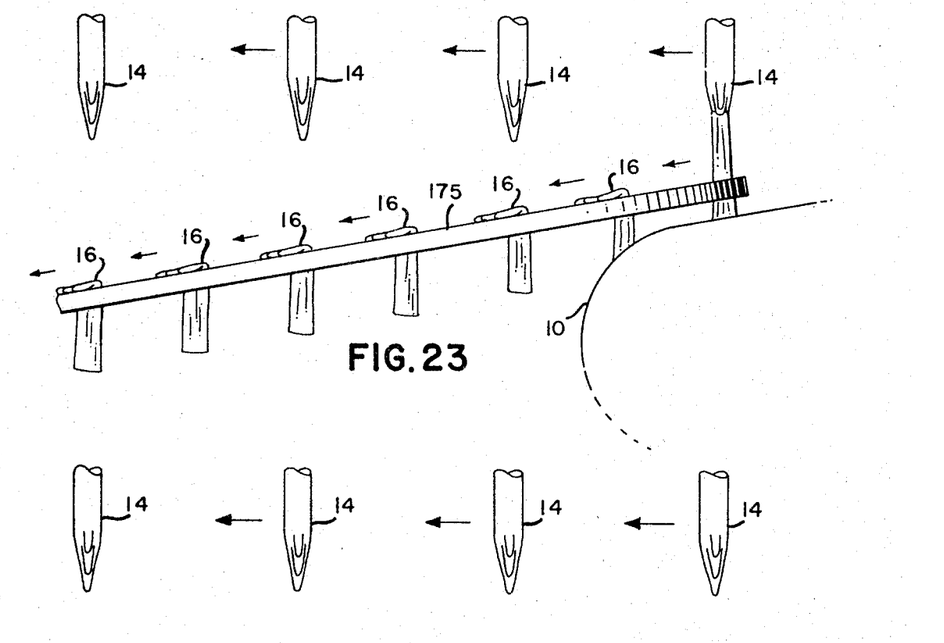
FIG. 23 is a schematic view illustrating a different form of discharge conveyor in which the discharge conveyor moves at a slower speed than the stripping heads, thereby spacing the gloves held in the discharge conveyor more closely together.

FIG. 23 illustrates schematically a modification of the discharge mechanism for the gloves which is especially useful with a relatively slow speed glove conveyor. In this case the relation of the molds 14 and of the path of travel of the stripper heads 21 is the same as in the preceding modification. The glove being stripped from a mold is gripped by a conveyor comprising a pair of belts 173, only one of which is seen in FIG. 23, and similar to the belts 161. This conveyor is traveling at a slower linear speed than the mold 14 so that the pair of belts grip the glove and carry it with the wrist portion in depending position to a point where it is stripped by a worker for inspection and packaging.

Figures 24, 25:
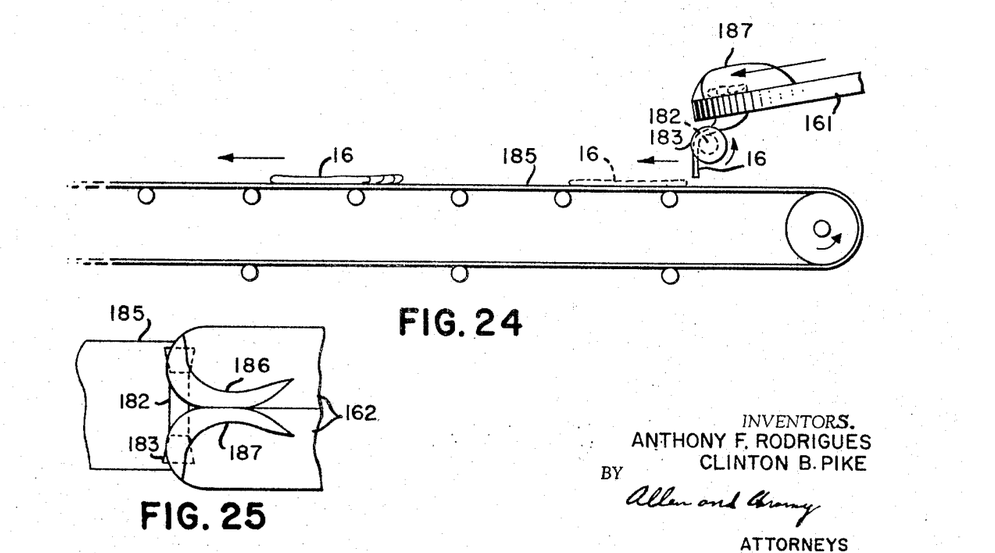
FIG. 24 is a schematic view of a still further modified form of the discharge conveyor apparatus, and in this case, the final discharge conveyor is moved at a faster speed than the primary discharge conveyor to receive the gloves from the stripping head.
FIG. 25 is a plan view of the discharge end of the belt conveyors at the point of transfer from these conveyors to the discharge conveyor illustrating the cone-like discharge guide surfaces of FIG. 24.

FIG. 24 illustrates a modified form of the invention in which the discharge conveyors 161 of the modification of FIGS. 21 and 22 discharge the gloves onto a belt-type conveyor 185, and this belt-type conveyor is traveling faster than the linear speed of the engaged belts 161. Associated with the discharge conveyors 161 and 185 is a control roller 182 having conical end portions 183. This control roller is suitably supported and preferably driven in a counter-clockwise direction as seen in FIG. 24, so that it will engage and lift the end of the glove over the top of the rollers and assist in laying it flat on the belt 185.

In order to guide and control the ends of the gloves projecting above the two belt conveyors 161, a pair of inclined members 186 and 187 are provided on the frame members adjacent to the meeting surfaces of the discharge belts 161. These members 186 and 187 provide a cone-like guide surface in engaging and controlling the gloves.

While we have shown and described certain preferred embodiments of the invention, it is apparent that the invention is capable of variation and modification from the forms shown so that the scope thereof should be limited only by the proper scope of the claims appended hereto.

We claim:

1. In a molding apparatus, an endless conveyor having series of spaced-apart molds supported thereon, means for driving said conveyor, an endless series of spaced-apart mold stripping heads corresponding to the spacing-apart of said molds, said series of stripping heads having a stretch extending along and registering with said molds for a portion of their travel, and endless series of mold control elements having a stretch extending along and registering with said molds for a portion of their travel, and means for causing each said element to engage and center a mold to control the position thereof with respect to the associated stripping head.

2. In a molding apparatus as recited in claim 1, in which said molds and said stripping heads have converging path portions, and means is provided for operating said control elements to effect tilting of each said mold during movement thereof along said converging path portion to control the angle of entry of a mold into cooperative relation with the stripping head.

3. In a molding apparatus, an endless series of spaced-apart molds mounted for travel through a path, means for moving said spaced-apart molds along said path, an endless series of stripping means mounted for cooperative stripping relation with respect to said molds during at least a portion of the path of travel thereof, and means associated with said molds and said heads for relatively positioning said molds and said heads in a desired registering relation for a stripping operation.

4. In a molding apparatus as recited in claim 3, in which means is provided for tipping a said mold in one direction during movement thereof into engagement with a stripping head, and means is provided at another portion of the path of travel thereof to effect tipping thereof in another direction during removal of a said mold from a stripping head.

5. In a molding apparatus as recited in claim 3, in which means is provided for positioning said stripping heads and said molds with respect to each other during the engagement of the stripping means with the articles on said molds.

6. In a molding apparatus as recited in claim 3, in which means is provided along the path of travel of said stripping heads for operating said stripping heads, and the gripping means is carried by said heads to effect gripping of an article on a mold.

7. In a molding apparatus as recited in claim 3, in which means is provided for engaging the stripping means of each head with the article on the mold associated therewith to place the stripping means in proper position for effecting a stripping operation of the article from the mold.

8. In a molding apparatus as recited in claim 7, which includes a cam mounted along said path, and a movable element carried by each stripping head for engagement with the cam.

9. In a molding apparatus as recited in claim 8, in which yieldable mounting means is provided for said cam to provide for yielding movement of the cam.

10. In a molding apparatus as recited in claim 3, in which each of said stripping heads includes means for engaging an article on a mold to effect rolling of the open end of the article, and means for driving said means in either direction, whereby the end of said article can be rolled away from a position on said mold and then can be rolled back to said position on said mold, said driving means including a reciprocable rack carried by each stripping head, a first cam means disposed along said path to engage said rack and effect movement thereof in one direction and a second cam means disposed on the opposite side of said path of travel to engage said rack and return it to its initial position.

11. In a molding apparatus as recited in claim 3, in which means is provided for effecting spacing-apart of the molds and the stripping heads in the latter part of their adjacent travel, whereby an article will be stretched between a mold and a head, and means is provided for engaging and removing an article so stretched between a mold and a head.

12. In a molding apparatus as recited in claim 11, in which said means for engaging and removing an article comprises a pair of parallel engaged conveyors.

13. In a molding apparatus as recited in claim 12, in which a second conveyor is provided for receiving articles deposited thereon from the discharge end of said pair of parallel conveyors.

14. In a molding apparatus as recited in claim 12, in which a pair of guide surfaces of generally conical contour are provided above said pair of engaged conveyors for guiding an article progressed along by said conveyors.

15. In a molding apparatus as recited in claim 13, in which a transverse roller is mounted between the discharge end of said pair of conveyors and said second conveyor to assist in depositing articles flat on said second conveyor.

16. In a molding apparatus as recited in claim 1, in which each of said molds has a floating connection with said conveyor providing for relative movement therebetween, and in which said series of mold control elements comprise a series of jaws for engaging and positioning said respective molds.

17. In a molding apparatus as recited in claim 16, in which cam tracks are provided extending along a portion of the path of travel of the mold positioning units and in which cam followers engage said cam tracks and are carried by said jaws.

References Cited

UNITED STATES PATENTS

| 2,346,485 | 4/1944 | Hahne | 18—2 |
| 2,779,055 | 1/1957 | Burger | 18—2 |
| 3,304,576 | 2/1967 | Keesling et al. | 18—2 |

WILLIAM J. STEPHENSON, *Primary Examiner.*